(12) United States Patent
Skliar et al.

(10) Patent No.: US 8,801,277 B2
(45) Date of Patent: Aug. 12, 2014

(54) ULTRASONIC TEMPERATURE MEASUREMENT DEVICE

(75) Inventors: Mikhail Skliar, Salt Lake City, UT (US); Kevin Whitty, Park City, UT (US); Anthony Butterfield, Sandy, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 52 days.

(21) Appl. No.: 13/522,433

(22) PCT Filed: Jan. 14, 2011

(86) PCT No.: PCT/US2011/021396
§ 371 (c)(1),
(2), (4) Date: Nov. 8, 2012

(87) PCT Pub. No.: WO2011/088393
PCT Pub. Date: Jul. 21, 2011

(65) Prior Publication Data
US 2013/0121373 A1    May 16, 2013

Related U.S. Application Data

(60) Provisional application No. 61/295,516, filed on Jan. 15, 2010.

(51) Int. Cl.
*G01K 11/22*    (2006.01)
*G01K 3/00*    (2006.01)

(52) U.S. Cl.
USPC .......................................... 374/119; 374/137

(58) Field of Classification Search
USPC .................................................. 374/119, 137
See application file for complete search history.

(56) References Cited

U.S. PATENT DOCUMENTS

| | | | |
|---|---|---|---|
| 4,195,523 A | | 4/1980 | Tasman et al. |
| 4,483,630 A | * | 11/1984 | Varela ............................ 374/119 |
| 5,022,014 A | * | 6/1991 | Kulczyk et al. ................. 367/87 |
| 5,044,769 A | | 9/1991 | Kulczyk et al. |
| 5,141,331 A | | 8/1992 | Oehler et al. |
| 5,286,109 A | | 2/1994 | Hanscombe et al. |
| 5,624,188 A | | 4/1997 | West |
| 6,269,700 B1 | * | 8/2001 | Nikolovski ...................... 73/642 |
| 6,517,240 B1 | | 2/2003 | Herb et al. |
| 6,837,109 B2 | * | 1/2005 | Okuno et al. ................... 73/597 |
| 7,404,671 B2 | * | 7/2008 | Heyman et al. ............... 374/117 |

(Continued)

FOREIGN PATENT DOCUMENTS

JP    2008 046036    2/2008

OTHER PUBLICATIONS

PCT/US2011/021396; filed Jan. 14, 2011; University of Utah . . . ; international search report dated Oct. 4, 2011.

(Continued)

*Primary Examiner* — Mirellys Jagan
(74) *Attorney, Agent, or Firm* — Thorpe North & Western LLP (57) ABSTRACT

An ultrasonic thermometer for measuring a temperature profile along a measurement axis of a solid structure, comprising a continuous measurement pathway of a solid structure (310) having a longitudinal measurement axis and proximal (202) and distal ends (204), and at least two backscatterers (332) formed therein transverse to the longitudinal axis and separated by a predetermined separation distance.

21 Claims, 5 Drawing Sheets

(56) References Cited

U.S. PATENT DOCUMENTS

| | | | |
|---|---|---|---|
| 8,016,757 B2* | 9/2011 | Kaczkowski et al. | 600/438 |
| 2007/0204671 A1 | 9/2007 | Sliwa et al. | |
| 2008/0107150 A1* | 5/2008 | Brummel et al. | 374/119 |
| 2008/0246625 A1 | 10/2008 | Chen et al. | |
| 2009/0007675 A1* | 1/2009 | Hammann et al. | 73/597 |
| 2010/0111133 A1* | 5/2010 | Yuhas et al. | 374/30 |
| 2011/0150031 A1* | 6/2011 | Abdelmoneum et al. | 374/117 |

OTHER PUBLICATIONS

Bennett, J.P., Kyei-Sing, K., "Refractory Loner Materials used in Slagging Gasifiers," *Refractory Applications and News*, 9: 20-25, 2004.

Powell, C., "Improved Refractory Materials for Slagging Gasification Systems," R&D Facts, DOE Office of Fossil Energy, NETL, 2007, http://204.154.137.14/publications/factsheets/rd/R&D063.pdf.

Dogan, C.P., Kwong, K.-S., Bennett, J.P. and Chinn, R.E. "Improved Refractories for Slagging Gasifiers in IGCC Power Systems", http://www.osti.gov/bridge/servlets/purl/835687-FLAfCQ/native/835687.PDF.

Guo, R.,, Cheng, G., Wang, Y., "Texaco Coal Gasification Quality Prediction by Neural Estimator Based on Dynamic PCA," Proc. 2006 IEEE Int. Conf. on Mechatronics and Automation, Luoyang, China, pp. 2241-2246, 2006.

Hornick, M.J. McDaniel, J.E., "Tampa Electric Integrated Gasification Combined-Cycle Project," Final technical report, http://204.154.137.14/technologies/coalpower/cctc/cctdp/bibliography/demonstration/aepg/baepgig_tampaig.html, 2002.

Liu, J.T.C., Rieker, G.B., Jeffries, J.B., Hanson, R.K., Gruber, M.R., Carter, C.D. and Mathur, T., "Near infrared Diode Laser Absorption Diagnostic for Temperature and Water Vapor in a Scramjet Combustor," Applied Optics, 44: 6701-6711, 2006.

Green, S.F., "An acoustic technique for rapid temperature distribution measurements," J. Acoustical Society of America, 77: 765-769, 1985.

Bramanti, M., Tonazzini, A., Tonazzini, A., "An acoustic pyrometer system for tomographic thermal imaging in power plant boilers, " IEEE Trans. Instrumentation and Measurement, 45:87-94, 1996.

Baudson, et al.; "Ultrasonic Measurement of Young's Modulus MgO/C Refractories at High Temperature;" 1999 Elsevier Science Limited; Printed in Great Britain, 0955-2219/99.

Sarigul; "Model-Based Estimation of Adiabatic Flame Temperature During coal Gasification;" Department of Chemical Engineering; The University of Utah; Dec. 2012.

Jia, et al.; "Ultrasound Measurements of Temperature Profile Across Gasifier Refractories: Method and Initial Validation"; ACS Publications; Received Dec. 19, 2012; Revised Mar. 3, 2013.

Rieker, et al.; "Calibration-free wavelength-modulation Spectroscopy for measurements of gas temperature and concentration in harsh environments"; Applied Optics/vol. 48, No. 29/Oct. 10, 2009.

Le; "An investigation of pulse-timing techniques for broadband ultrasonic velocity determination in cancellous bone: a simulation study"; Phys. Med. Biol. 43, (1998) 2295-2308, printed in the UK.

Makris; "Acoustical Oceanography: Inversions for Surface Volume, and Bottom Properties"; J. Acoust. Soc. Am., vol. 99, No. 4, Pt2, Apr. 1996.

Lu, J., Takahashi, S., Takahashi, S., "Acoustic computer tomographic pyrometry for twodimensional measurement of gases taking into account the effect of refraction of sound wave paths," Measurement Science and Technology, 11: 692-697, 2000.

Kychakoff, G., Hollingshead, A.F., Boyd, S.P., "Use of acoustic temperature measurements in the cement manufacturing pyroprocess," Cement Industry Technical Conference, pp. 23-33, May 2005.

Kleppe, J., Norris, W., McPherson, D., Fralick, D., "The Measurement of Performance of Combustors Using Passive Acoustic Methods," 42rd AIAA Aerospace Sciences Meeting and Exhibit, Paper AIAA 2004-1046, Jan. 2004.

Norris, W.J., Kleppe, J.A., McPherson, D.R., Fralick, G.C., "The Measurement of Performance of Combustors using Passive Acoustic Methods: Additional Results," 43rd AIAA Aerospace Sciences Meeting and Exhibit, Paper AIAA 2005-219, Jan. 2005.

Lee, Y.J., Khuri-Yakub, B.T., Saraswat, K., "Temperature measurement in rapid thermal processing using the acoustic temperature sensor," IEEE Trans. Semiconductor Manufacturing, 9:115-121, 1996.

Arthur, R.M.; Trobaugh, J.V.; Straube, W.L.; Moros, E.G., "Temperature dependence of ultrasonic backscattered energy in motion compensated images," IEEE Trans. Ultrasonics, Ferroelectric and Frequency Control, 52:1644-1652, 2005.

Zhang, H., Basin, M., Skliar, M., "Ito-Volterra Optimal State Estimation with Continuous, Multirate, Randomly Sampled, and Delayed Measurements," IEEE Trans. Automat. Control, 52:401-416, 2007.

Roubicek; "Gas Temperature measurement in the fireside of process heaters-using Acoustic Pyrometry"; Presented 2003 NPRA Maintenance Conference in Salt Lake City.

* cited by examiner

ULTRASONIC TEMPERATURE MEASUREMENT DEVICE

FIELD OF THE INVENTION

The field of the invention relates generally to temperature measurements of solid bodies, such as measurement of a temperature profile through the refractory wall of a gasifier chamber.

BACKGROUND

Harsh environments are common in many applications, including conversion of fossil fuels. Coal gasification is one example of a process with extreme temperatures, chemical aggressiveness, mechanical abrasion, and pressure conditions. At the same time, coal gasification is a promising technology for efficient energy production and a component of the U.S. Department of Energy's (DOE's) Vision 21 program. Several technological challenges can impact the reliability and economics of coal gasification. One such challenge is the degradation of gasifier refractory by chemical and physical mechanisms, as illustrated in FIGS. 1A-1F.

Figure 1A:
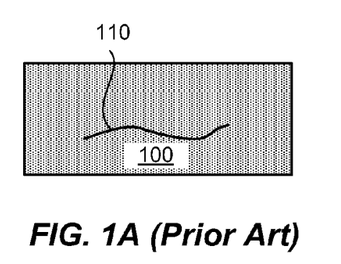
FIGS. 1A-1F illustrates the various stages of refractory degradation as recognized in the art.
Figure 1B:
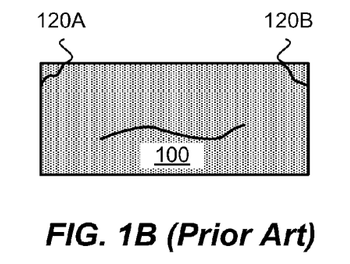
Figure 1C:
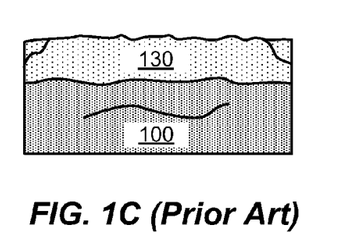
Figure 1D:
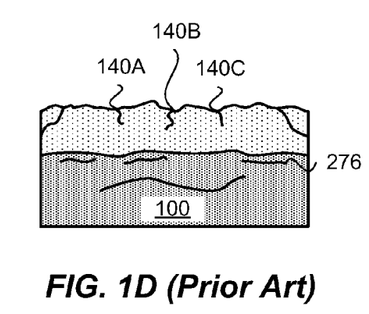
Figure 1E:
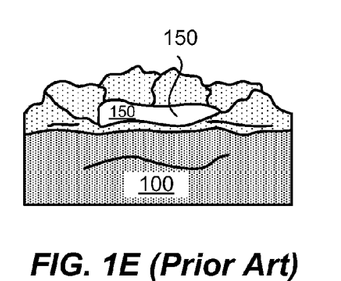
Figure 1F:
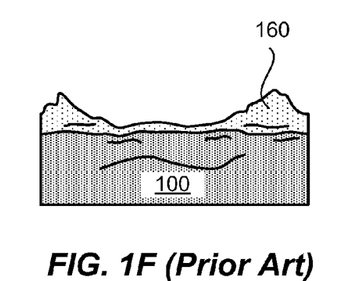

For example, a new refractory liner of a refractory (100) used in slagging gasifiers may contain internal cracks (110) from pressing and firing, as illustrated in FIG. 1A. During a preheat process, the refractory may experience pinch spalling (120A and 120B) due to hoop stresses, as illustrated in FIG. 1B. With gasification, infiltration and/or corrosion (130) can occur to the refractory due to extreme temperatures, chemical aggressiveness, mechanical abrasion, and pressure conditions, as illustrated in FIG. 1C. Molten slag can infiltrate the cracks and pores on the hot face of the refractory during molten slag infiltration, and surface corrosion due to slag infiltration can begin. Horizontal crack formation (140A-140C) in the refractory can occur due to thermal cycling, stress accumulation, and creep, as illustrated in FIG. 1D. When cracks join, internal void formation (150) in the refractory can occur, spalling (peeling) can begin, creep can occur on slag penetrated hot face areas, and hot face corrosion can continue, as illustrated in FIG. 1E. During the renewed cycle material can break off on the hot face (160) of the refractory, as illustrated in FIG. 1F. The cycle repeats with infiltration and/or corrosion, gradually wearing away the refractory lining. As a result of the stresses on the refractory, the refractory may be replaced as often as every 10-18 months at a substantial cost and loss of production. In extreme cases, the refractory must be replaced as often as every 90 days in high-wear zones of coal gasifiers.

An improved refractory system and sensors for monitoring the refractory system can be beneficial in improving the gasification process and in reducing the costs associated with gasification. Sensors that provide direct or indirect measurements of the refractory temperature, thickness, and changes in material properties can be used to monitor and manage the refractory.

Direct measurement sensors capable of reliably performing in the harsh environment over an extended period of operation to monitor refractory degradation have not been available. Furthermore, continuous measurements of operating conditions (such as temperatures, pressures, and concentrations) in the reaction zone can be difficult to obtain and may not be utilized in practice because even the most hardened conventional sensors can quickly lose functionality in a harsh gasification environment.

The measurements used to monitor gasification and manage the refractory have been obtained using direct or indirect measurements. The direct measurement approach attempts to develop hardened sensors that can withstand harsh gasification environment for a prolonged period of time, such as thermocouples intended to provide physical and chemical resistance to attacks by most gasifier slags. Such direct measurement sensors can use heavy sheathing to improve service life of insertion sensors, but also can make such devices less sensitive to dynamic changes in temperatures, which can be important in the refractory life management since rapid temperature variations can introduce thermal stresses.

In the informative indirect (or secondary) measurement approach, temperatures, pressures, and compositions of streams into and out of a gasifier can be used with appropriate models to infer (or estimate) in real time otherwise inaccessible operating parameters inside the reaction zone and the state of the refractory itself. The combination of secondary measurements, the models that use them as the inputs, and the methods for the model-based estimation of gasification parameters of primary interest based on secondary measurements form the core of the second approach to the refractory management. Inferential measurements have been used in many process industries.

However, two limitations can exist with inferential measurements. First, the quality of inferences can depend on modeling errors and uncertainties, un-modeled changes to the process itself (e.g., due to wear and aging), the input information, and unknown process disturbances. Second, the measurement accuracy, sensitivity, and response time of inferential measurement can compare poorly with the corresponding characteristics of the direct measurements.

SUMMARY

An ultrasonic thermometer for measuring a temperature profile along a measurement axis of the solid structure can include a continuous measurement pathway of a solid structure having a longitudinal measurement axis and proximal and distal ends, and two or more backscatterers formed therein transverse to the longitudinal axis and separated by a predetermined separation distance.

In another aspect, the ultrasonic thermometer includes an ultrasonic emitter positioned at the proximal end for transmitting one or more ultrasonic pulses along the measurement pathway, an ultrasonic receiver located adjacent to the ultrasonic sound emitter for receiving pulse echoes reflected from the backscatterers, and a processing device electronically coupled to the ultrasonic transducer and receiver. The processing device further includes a timer module configured to determine one or more first time intervals between pulse echoes from the backscatterer, a calculator module for using the first time intervals to determine the instantaneous average temperature of the structure between the backscatterers, and an output device configured to output the instantaneous average temperature of the structure between the backscatterers.

In yet another aspect, the ultrasonic thermometer further includes the timer module being configured to determine a second time interval for a pulse echo from the distal end of the measurement pathway. A calculator module can be provided for using the second time interval and a distribution of the instantaneous average temperatures of the structure to determine an instantaneous distance of the measurement pathway. The output device can be configured to output the instantaneous distance of the measurement pathway.

In accordance with another representative example, the ultrasonic thermometer can also include a method of measuring a temperature profile or length of a solid structure along a measurement axis. In one aspect, the method includes installing a continuous measurement pathway along a measurement axis of a solid structure having a longitudinal axis with proximal and distal ends and a plurality of backscatterers formed therein transverse to the longitudinal axis and separated by a plurality of predetermined separation distances, and measuring the temperature profile of the solid structure using at least one ultrasonic pulse along the measurement pathway.

The method can include emitting at least one ultrasonic pulse along the measurement pathway from an ultrasonic emitter positioned at the proximal end of the pathway, receiving a plurality of pulse echoes reflected from the plurality of backscatterers with an ultrasonic receiver adjacent the ultrasonic sound emitter, timing time intervals between the each of the plurality of pulse echoes, calculating an instantaneous average temperature of the structure between each of the plurality of backscatterers using the time intervals, and outputting the instantaneous average temperatures of the structure between each of the plurality of backscatterers to measure a temperature profile of the solid structure along the measurement axis.

The method can include receiving pulse echoes reflected from a furthest backscatterer and the distal end of the measurement pathway, timing a time interval between the pulse echoes reflected from a furthest backscatterer and the distal end of the measurement pathway, calculating an instantaneous distance of the measurement pathway using the second time interval, and outputting the instantaneous distance of the measurement pathway to measure a thickness of the solid structure along the measurement axis.

BRIEF DESCRIPTION OF THE DRAWINGS

Features and advantages of the present disclosure will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which.

DETAILED DESCRIPTION

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative examples of the invention will best understood with reference to the accompanying drawings, wherein the elements and features of the examples are designated by numerals throughout.

Illustrated in FIGS. 3-7 are several representative examples of an ultrasonic thermometer for measuring a temperature profile along a measurement axis of a solid structure, which examples also include various methods of measuring the temperature profile of a solid structure along the measurement axis. As described, the ultrasonic thermometer provides several benefits over other devices and methods for measuring temperature. However, the recited benefits are not meant to be limiting in any way, as one skilled in the art will appreciate that other benefits may also be realized upon practicing the concepts herein.

Applications of the ultrasound thermometer are many. For example, using an ultrasonic thermometer for measuring a temperature profile along a measurement axis of a solid structure can improve the real-time characterization of the refractory. With improved real-time characterization of the refractory, the gasification process can be controlled in a way that extends the refractory life, while maintaining economical operation. The economic benefits of the refractory life management can be derived from avoiding unnecessarily conservative decisions to interrupt the process for refractory inspection and/or replacement, improved process availability and safety, prevention of costly repairs caused by refractory failure, and maintaining operation that extends the service life of the refractory.

An ultrasonic thermometer can be used to obtain direct measurements of a refractory using a non-invasive or minimally invasive method that does not require the direct insertion of a sensing element into the harsh environment. The noninvasive method for characterization of the gasification process and gasifier refractories can include acoustic temperature and thickness measurements using the ultrasonic temperature measurement device described herein.

Acoustic Measurements of Temperature

Measurements of the temperature distribution inside the refractory and on a hot surface of the refractory can be useful for several reasons. First, changing temperatures and gradients inside the refractory can give the direct indication of thermal protection and provide information on the refractory degradation. Second, the hot face temperature and temperature gradients can affect refractory degradation, which often starts with crack formation due to thermal stresses. Finally, if the hot face temperature of the refractory is known, the reactor zone temperature can be estimated and used to control gasification.

An ultrasonic thermometer as described herein can provide for noninvasive acoustic methods to measure refractory temperature. The physical basis of the approach is the temperature dependence of the speed of sound. By measuring time, $\tau$, for an acoustic signal to travel a known distance, d, between a transducer and a receiver, an average temperature along the path of propagation can be estimated.

Specifically, in a gas at a constant temperature, the speed of sound, $c=d/\tau$, can be used to estimate the absolute temperature, T, using Equation (1):

$$c(T) = \sqrt{\frac{\gamma RT}{M}} \tag{1}$$

where d is the distance between a transducer and the receiver, the arrival delay (travel or flight time) $\tau$ can be measured, and $\gamma$ is the adiabatic constant (specific to different gases), R is the universal gas constant (in J/mol K), and M is the molecular weight of the gas in kg/mol.

The described approach to measuring an average temperature in gases, known as acoustic pyrometry, can be used in many high-temperature applications, such as combustion and the cement industry. A benefit of acoustic pyrometry is the ability to obtain real-time temperature measurements over an extremely large range of temperatures (e.g. 0 to 3500° F.), which allows acoustic pyrometry to be used for process monitoring from a cold start up to normal high-temperature operation. Measurement uncertainties can occur when temperature along the line of sight between the transducer and the receiver varies significantly and when unknown changes in the adiabatic constant due to variability in the gas composition are present. The utilized acoustic frequency range must be low (typically≤3 kHz) because higher-frequency sound does not propagate well through gases. The consequence of low excitation frequencies can be the interference from combustion instabilities, sounds produced by a turbulent flow, and other disturbances, collectively known as a passive acoustic signature.

In liquids, the speed of sound can be expressed as Equation (2):

$$c = \sqrt{\frac{B}{\rho}} \tag{2}$$

where B can be the bulk modulus of the material and $\rho$ is be density of the material.

In solids the speed of sound can depend on the deformation mode of the solid matrix, whether compressive deformation (P-waves) or sheer deformation (S-waves). The speed of a longitudinal (or compressive) wave $c_L$ through a solid is given in Equation (3):

$$c_L = \sqrt{\frac{K + \frac{4}{3}G}{\rho}} = \sqrt{\frac{E(1-v)}{\rho(1+v)(1-2v)}} \tag{3}$$

where K is the bulk modulus of the elastic materials, G is the shear modulus of the elastic materials, E is the Young's modulus, and v is the Poisson's ratio. The longitudinal wave, transverse wave, compressional wave, or compression wave can be perpendicular, right angled, or normal to the direction of energy transfer. The speed of sound of a sheer wave $c_s$, (parallel or tangential to the face of a material) through a solid is given in Equation (4):

$$c_s = \sqrt{\frac{G}{\rho}} \tag{4}$$

Method for Ultrasound Measurements of an Average Refractory Temperature

Figure 2:
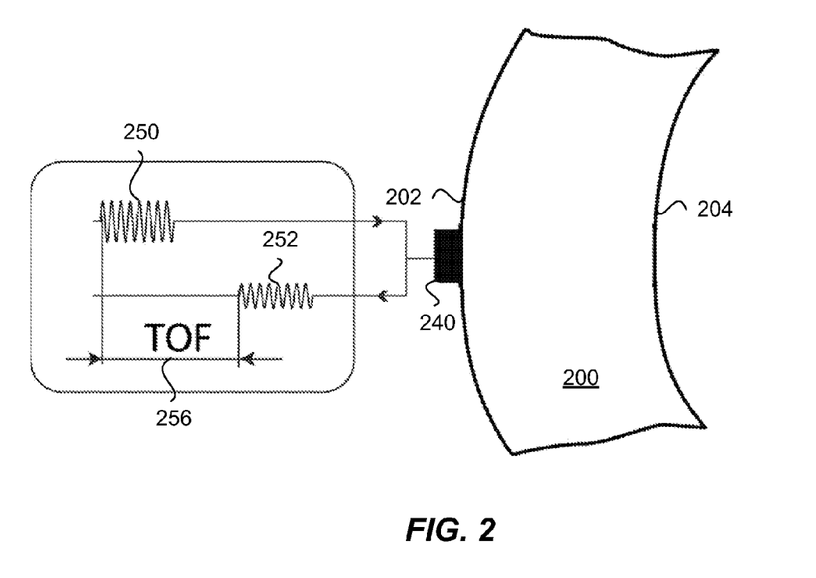
FIG. 2 illustrates ultrasonic temperature measurement device for measuring the average temperature through the refractory wall of a gasifier vessel, in accordance with an example.

In one simple implementation, the time of flight (TOF) (256) or return delay of an ultrasound (US) pulse (250) introduced on a cold side (202) of the refractory (200) and reflected (252) from the refractory's hot side (204) can be measured, as illustrated in FIG. 2. The reflection can occur due to a substantial change in density and speed of sound at the transition from the refractory to the reactor zone. The temperature dependence of the speed of sound can then be used to determine an average temperature over the refractory thickness.

The implementation of acoustic temperature measurements can remove sensitive electronic equipment away from the harsh gasification environment, allowing acoustical coupling between the US transducer and the refractory on the cold side, which can be implemented with minimal modification to a gasifier. Since the cold side temperature can still be elevated from the ambient, high temperature transducers (such as those available from GE Inspection Technologies, rated for a continuous operation at the temperatures up to 250° C.) can be used in the pulsed mode. The same piezoelectric transducer (240) can also be used as an emitter and a receiver of ultrasound energy, in which case care must be taken to decouple high-power ultrasound excitation equipment and sensitive low-voltage receiving electronics. Optionally, a separate high-power transducer (FIG. 4, 442) and a sensitive receiver (FIG. 4, 444A-444B) can be used. In the separate transducer (emitter) and receiver case, an angled-beam transducer (available from GE) can be used to direct US energy such that after reflection from the hot face of the refractory, the reflected wave reaches a separately positioned receiver. One example is the high temperature angle beam probe W 45 B 2 GV which operates at 2 MHz and is available from GE. In both examples, the coupling between the transducer/receiver and the cold side of the refractory can be established using a suitable coupling. For example, such features may be formed directly on the surface via deposition processes. However, typically a couplant material can be used such as a solid filler powder which melts at high temperature. Non-limiting examples of couplants include ZGM (available from Krautkramer), Sono product line (from Sonotech Inc.), Panametrics-NDT Couplant E (available from Olympus Corp.). The ZGM product allows for wall thickness measurements on surfaces with temperatures between 400° F. to 1000° F. The equipment used for US signal generation, impedance matching, and signal acquisition can be available commercially from such companies as RF amplifiers from AR RF/Microwave Instrumentation and data acquisition from National Instruments.

Estimating Temperature Distribution from Average Temperature Measurements

Large thermal gradients and thermal resistance in the refractory can make average temperature measurements insensitive to changes in operating conditions inside the gasifier and in detecting refractory degradation. Thus, estimating the temperature distribution inside the refractory can be desirable.

A method to estimating the temperature distribution based on the measurements of an average temperature can be to apply model-based de-convolution of the measured average temperature. Assuming the refractory temperature is changing in the radial direction, r, the one-dimensional temperature distribution, T(t,r), in the refractory can be governed by the partial differential equation (PDE) represented in Equation (5):

$$\rho C \frac{\partial T}{\partial t} = k \frac{1}{r} \frac{\partial}{\partial r} \left( r \frac{\partial}{\partial r} \right) T \qquad (5)$$

where $\rho$ is the refractory density, C is heat capacity, and k is the thermal conductivity. T(t,r) has two boundary conditions, $T(r_C)=T_c$ on the cold surface, $r_c$, of the refractory, and $T(r_h)=T_h$ on the hot surface, $r_h$, of the refractory. Given the average temperature measurement through the refractory thickness $\Delta r=r_c-r_h$ obtained using ultrasound can be determined by Equation (6):

$$T_{ave}(t) = \int_{r_h}^{r_c} T(t,r) dr \qquad (6)$$

and assuming that the cold-side surface temperature can be measured (by thermocouples or thermal imaging), Equation (5) can be repeatedly solved by iterating over different values of unknown $T_h$ until the calculated average temperature distribution matches the measured $T_{ave}(t)$.

The dependence of model parameters (the values of $\rho$, C, and k in Equation (5)) on temperatures and the model parameter's change during refractory degradation can introduce uncertainty. To overcome potential for uncertainty, the methods for simultaneous state and parameter estimation may be used. The extended Kalman filter (EKF) can be used for simultaneous state and parameter estimation. Because the EKF can be a linearization based technique, the EKF can give spurious results, or can converge to wrong estimates of the model states and/or parameters. M. Basin describes a method for the optimal joint state and parameter estimation that can be more robust than the standard techniques (Basin, M., Perez, J., Skliar, M., "Optimal state filtering and parameter identification for linear systems," Optim. Contr. Appl. Met., 29:159-166, 2008, which is incorporated herein by reference). These models can be used to analyze and manipulate data collected from the ultrasonic thermometer described herein.

Direct Ultrasound Measurements of Temperature Distribution in the Refractory

Figure 3:
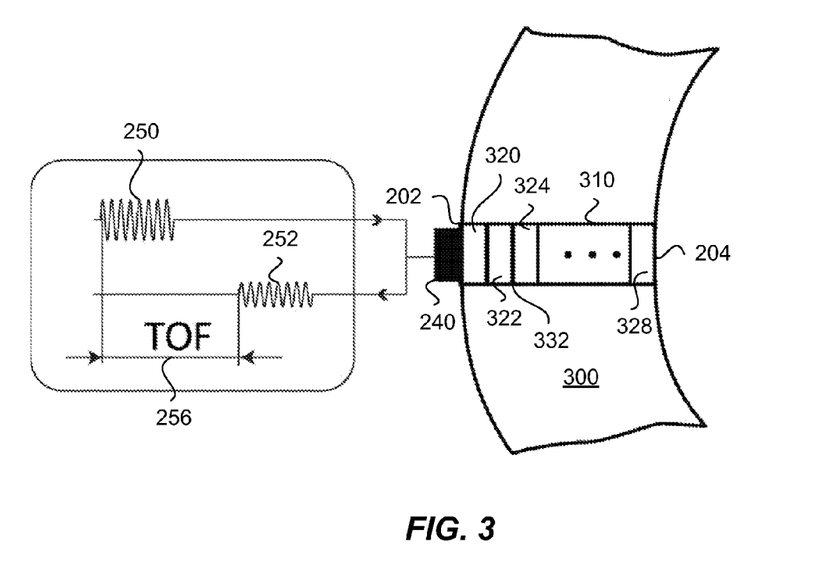
FIG. 3 illustrates ultrasonic temperature measurement device for measuring the temperature distribution through the refractory wall of a gasifier vessel, in accordance with an example.

Referring initially to FIG. 3, a solid structure (310) within a refractory (300) can include at least two backscatters and at least two temperature zones. An ultrasonic thermometer can be used for measuring a temperature profile along a measurement axis of the solid structure, which can be perpendicular to the surface of a refractory between a proximal end (202) and a distal end (204). The proximal end can be on a cold side (colder than a hot side) of the refractory, and distal end can be on a hot side of the refractory (hotter than the cold side). The transducer and/or receiver (240) can be on the same side of the refractory as the proximal end. The solid structure can have a continuous measurement pathway of a solid structure having a longitudinal measurement axis and proximal and distal ends. The continuous measurement pathway can include an elongated body conforming to a surface of the solid structure to measure a temperature profile across of the surface. The elongated body can be flexible and have a non-circular cross-sectional profile. The at least two backscatterers formed in the solid structure transverse to the longitudinal axis can be separated by a predetermined separation distance, forming temperature zones between the at least two backscatterers.

Figure 4:
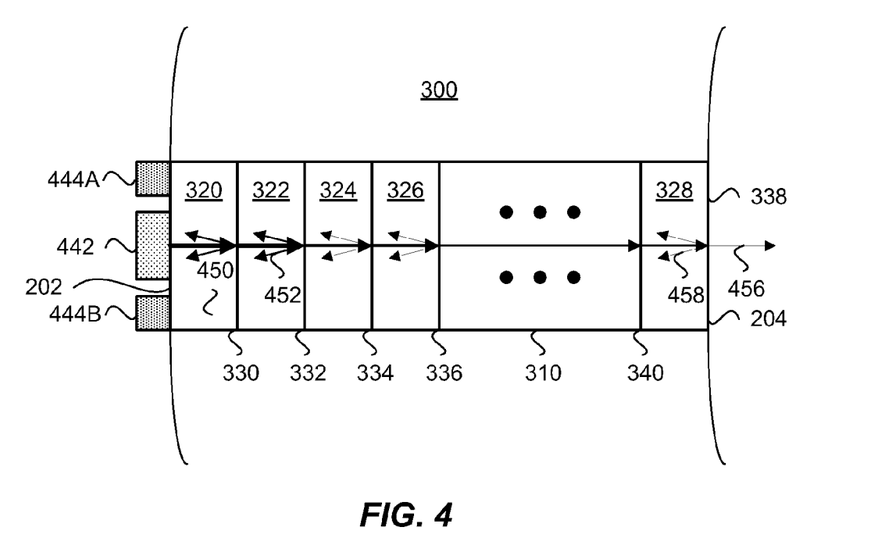
FIG. 4 illustrates ultrasonic temperature measurement device for measuring the temperature distribution through the refractory wall of a gasifier vessel, in accordance with an example.
Figure 5:
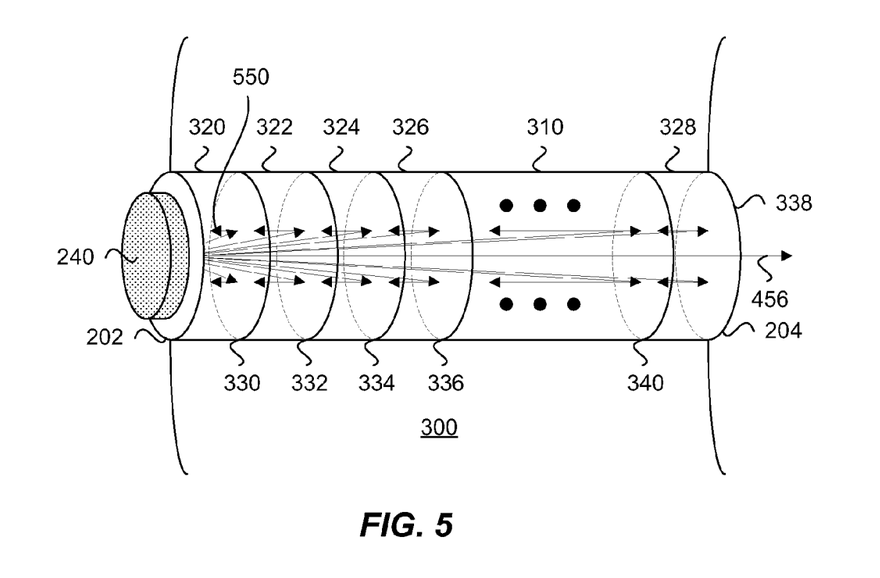
FIG. 5 illustrates ultrasonic temperature measurement device for measuring the temperature distribution through the refractory wall of a gasifier vessel, in accordance with an example.

In an example, an ultrasound propagation path with controlled backscattering can be created at predetermined spatial locations, as illustrated in FIGS. 3-7. FIGS. 3-7 illustrate various approaches to create backscattering which allows analysis as described herein. In examples shown in FIGS. 3 and 5-7 a common piezoelectric element (240) serves as a transducer and the receiver. FIG. 4 provides an example of a separate transducer (442) and a receiver (444A-444B). In FIGS. 3-5, partial US reflections (450, 452, and 550) can be created by inclusions, changing density, stratified layers, or other modifications to the backscatterer material, which can create a scatter or backscatter of a US wave or pulse (250). Backscattering can include the partial US reflections from inclusions, changing density, stratified layers, or other modifications to the refractory material. A backscatter is the structure that creates backscattering.

An ultrasound pulse (250), generated by a transducer (240) and partially reflected (450) from the first scatterer (330), can create a return echo (252) from the first backscatterer that will be the first to return back to the receiver (240). The time of flight (TOF) (256) of the first echo can give an indication of the average temperature in the first zone (320) of the refractory (300), between the cold surface (202) and the first scatterer (330). By subtracting the TOF of the second echo signal (452) and the first echo signal (252, 450, and 550), the time of flight between the first and the second scatters is obtained from which the average temperature between the first backscatterer (330) and the second backscatterer (332) can be estimated. The method can be repeated for the remaining backscatterers (334, 336, 338, and 340) until the estimate of the temperature distribution throughout the zones (320, 322, 324, 326, through 328) of the refractory can be obtained. A solid structure 310 within a refractory can include at least two backscatters and at least two temperature zones. With the distribution known, the last echo (458), reflected from the refractory-reactor zone surface, can be used to determine $T_h$, the temperature of the refractory's interior hot surface. The spatial resolution with which the temperature distribution may be measured can be determined by the spacing of the backscatterers and the wavelength of the US excitation pulse. A finer spatial resolution can be achieved by selecting a sufficiently high US frequency. The separation distance between backscatterers can range from less than or about two millimeters to about two centimeters. The separation differences between backscatterers may have a uniform spacing, although the separation differences between backscatterers can also be different. For example, the separation differences between backscatterers nearer to the distal end can be closer together where temperature changes are greater than the changes near the proximal end where temperature variation may not be as great.

Figure 6:
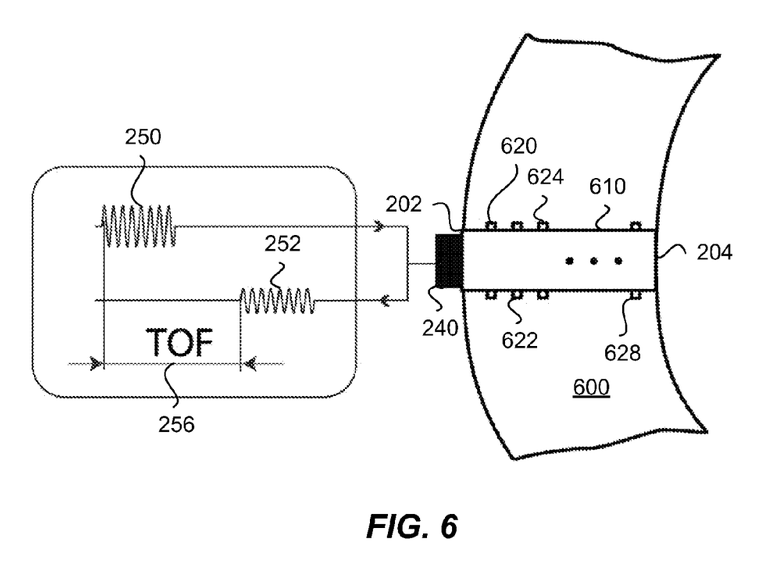
FIG. 6 illustrates ultrasonic temperature measurement device for measuring the temperature distribution through the refractory wall of a gasifier vessel, in accordance with an example.
Figure 7:
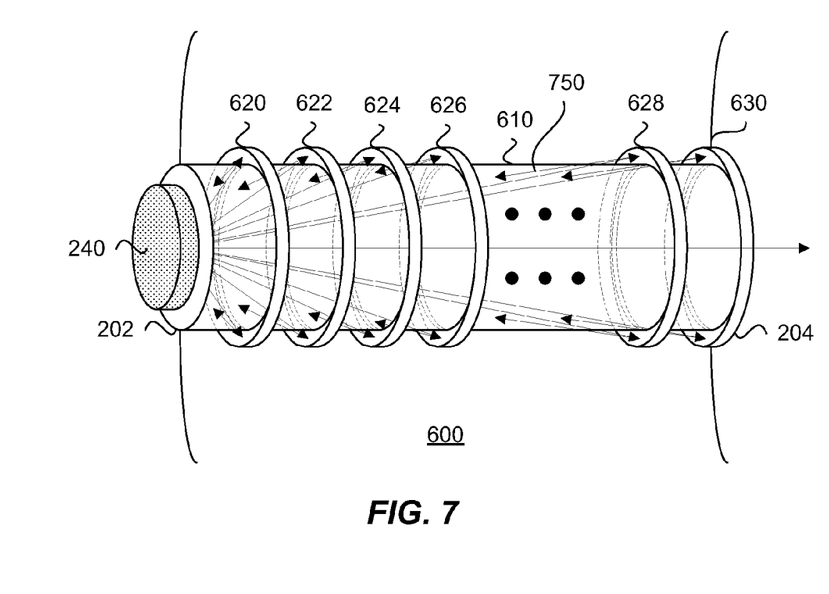
FIG. 7 illustrates ultrasonic temperature measurement device for measuring the temperature distribution through the refractory wall of a gasifier vessel, in accordance with an example.

In addition to creating backscatterers by controlled modification of properties of the refractory bricks or refractory concrete casting, the ultrasound reflections can be created by geometric changes in the US propagation path (620, 622, 624, 626, 628, and 630) through an embedded refractory insert illustrated in FIGS. 6-7. Such an insert can either have a varying geometry, as shown in FIGS. 6-7, designed to produce distinct US reflections at predetermined spatial positions, or layered properties, as shown in FIGS. 3-5, resulting in partial US refractions. Changes in the insert geometry can be produced by machining, casting, and other suitable methods. The layered changes to the material properties can be obtained by sequential casting, localized doping, thermal treatment, and other suitable methods. Separately produced inserts can be introduced into the refractory during its replacement, service, or relining, allowing the solution shown in FIGS. 6-7 to be implemented without the introduction of changes in density or inclusions into the refractory materials.

The continuous measurement pathway can include an elongated insert configured to be positioned through a thickness of a refractory wall of a heated vessel to measure a temperature profile across a thickness of the refractory wall. The insert may be an elongated insert filament having a diameter ranging from less than or about 1 mm to about 5 cm. The heated vessel can include the proximal end being a cold side and the distal end being a hot side. An elongated insert can be a cylindrical insert (610) with machined or cast collars (620, 622, 624, 626, 628, and 630). Backscatterers in the insert can include physical discontinuities in a surface of the elongated insert. The backscatterers can include machined collars, cast collars, machined notches, cast notches, or combinations. For example, the geometry shown in FIG. 7 can be easily produced by machining a cylindrical blank. The insert can be made from a material substantially similar to a material of the refractory wall or from a different material from the refractory. A refractory fabricated from a different material can be selected with lower ultrasound absorption than the refractory. Issues related to matching thermal expansion, conductivity, and other properties to the refractory material can be considered in selecting a different material for the insert. Composition gradients, minimizing mismatch by choice of materials, and/or thermal pretreatments can be used to reduce such mismatch problems. As a general guideline insert materials can have thermal expansion and degradation resistance which is sufficiently similar to the surrounding refractory material so as to avoid acceleration of degradation over refractory which is not modified with the inserts.

Backscatterers can be ultrasonic reflectors embedded across a cross-section of the continuous measurement pathway. Backscatters can include dispersed metallic particles, dispersed ceramic particles, a metallic grating, a ceramic grating, a void, or combination thereof. Adjacent backscatters can have differences in density, composition, or other parameters which are sufficient to modify acoustic impedance by changing material density and speed of sound trough the material. Reflections are created whenever acoustic impedance changes along the length of ultrasound propagation. Changes in density and/or speed of sound change that impedance. If the difference in impedance is sufficiently large (e.g. an interface between air and solid), the ultrasound wave will completely reflect back (i.e. no propagation through the interface). Small changes will introduce small reflections. If the impedance is constant, there will be no reflection. The incorporation of small inclusions, such as particles (e.g., ceramic or metallic particles of tungsten, titanium, vanadium) and small voids will scatter the ultrasound energy, directing part of it back to the transducer. Non-limiting examples of suitable ceramic particles can include silica, alumina, titania, tungsten carbide, boron nitride, silicon nitride, composites thereof, and combinations thereof. The choice of material across the pathway can affect a number of variables related to the US pulse. In particular, high frequency signals can be desirable to increase spatial resolution of the temperature profile measurement. Frequencies from about 20 kHz to about 10 MHz can be useful. A temperature resolution of less than a few millimeters can be desired in some aspects, in which frequencies greater than 10 MHz can be beneficial. In such cases, low thermal conductivity material can be desirable. Materials which have low loss at high frequencies can minimize signal loss of the ultrasound. Non-limiting examples of materials with low thermal conductivity can include various crystals and metals. The materials in the continuous measurement pathway may include at least one material having a thermal conductivity of less than or about 0.5 W/m·K.

The ultrasonic thermometer used for measuring a temperature profile along a measurement axis of a solid structure can include an ultrasonic emitter positioned at the proximal end for transmitting at least one ultrasonic pulse along the measurement pathway. The ultrasonic thermometer can include an ultrasonic receiver adjacent the ultrasonic sound emitter for receiving pulse echoes reflected from the at least two backscatterers. The emitter and receiver may be housed in the same device. The emitter and the receiver may be a common device. The emitter and the receiver may be formed on the same electronic chip or die. For example, the chip may be a micro-electromechanical (MEM) chip. The emitter may be placed in different locations from each receiver. The ultrasonic emitter and the ultrasonic receiver can be separated by a lateral distance at the proximal end of the continuous pathway to emit pulses and receive pulse echoes from at least two backscatterers at an acute angle. The emitter and the receiver can optionally be placed on the opposite sides of the ultrasound propagation path. The emitter can be configured to emit at least one ultrasonic pulse with a frequency greater than or about 100 kilohertz. In another aspect, the emitter can be configured to emit at least one ultrasonic pulse with a frequency greater than or about 1 megahertz.

The ultrasonic thermometer can include a processing device electronically coupled to the ultrasonic transducer and receiver. The processing device may include a timer module, a first calculator module, a second calculator module, and an output device. The timer module can be configured to determine at least one first time interval between pulse echoes from the at least two backscatterers or configured to determine a second time interval for a pulse echo from the distal end of the measurement pathway. The timer module may be configured to determine a second time interval for a pulse echo from the distal end of the measurement pathway. A first calculator module may use the at least one first time interval to determine the instantaneous average temperature of the structure between the at least two backscatterers. A second calculator module may use the second time interval and a distribution of the instantaneous average temperatures of the structure to determine an instantaneous distance of the measurement pathway. An output device may be configured to output the instantaneous average temperature between the at least two backscatterers or configured to output the instantaneous distance of the measurement pathway.

The processing device can include memory, a central processing unit (CPU), and a data repository (e.g., database) for receiving reflected echoes. Memory may be RAM, flash drive, or other volatile or non-volatile medium for storing electronic data. The CPU can provide functionality for the first and second calculator modules. The instantaneous averages can be stored in memory or in the data repository. Each instantaneous temperature calculated for each zone may be calculated and stored individually.

Ultrasound Measurements of Refractory Thickness

Ultrasound can be a nondestructive method for measuring thickness of solid materials at a known and uniform temperature. When temperature is not uniform and is unknown, the methods using ultrasound for measuring thickness can produce significant thickness measurement errors. A refractory thickness measurement method is provided in which errors caused by temperature non-uniformity can be compensated for. The refectory temperature distribution can be measured first, as described above. With known temperature distribution, the time of flight of the last return echo in the train of reflections can be adjusted for the temperature-dependent speed of sound and the temperature compensated refractory thickness calculated. Thus, measured thickness can provide a reliable, real time method for monitoring the refractory.

The ultrasound can be used to detect internal refractory degradation that starts with fissure formation, as depicted in FIGS. 1A-1F. Each new sufficiently large fissure in the path of ultrasound can produce an echo which will be backscattered back to the receiver. A series of echoes monitored over time can create a degradation signature, with an adequate signal analysis which may be used to monitor the insipient degradation prior to the actual reduction in the refractory thickness.

Additional Aspects

The development of the described ultrasound measurement system can have the following specific aspects:

Providing an US method for measuring an average refractory temperature, $T_{ave}$, based on the time of flight of the ultrasound pulse introduced on the cold side of the refractory and reflected from the reaction zone interface (hot side), as illustrated in FIG. 2.

A heat transport model of the refractory and the model-based method can be provided for estimating the refractory temperature distribution based on the measurements of $T_{ave}$(t) and the cold surface temperature of the refractory, $T_c$(t). The ultrasonic thermometer may be combined with a direct temperature sensor positioned on the proximal end or cold side of a refractory. Pointwise contact measurements of $T_c$ and the corresponding one-dimensional heat transport model can be sufficient to obtain an accurate estimate of temperature distribution in the refractory. The ultrasonic thermometer combined with a direct temperature sensor can quantify the improvements in estimation accuracy and the response time achieved when a detailed, spatially distributed measurements of $T_c$ are obtained by thermal imaging and used in a comprehensive 3D heat transport model.

The difference between the directly measured and the estimated temperature distribution can be used to characterize refractory degradation. First, the thermal conductivity k(r) in Equation (5) can be identified as a function of spatial position, r, in such a way that the model predictions of T(r) can match with the direct acoustic measurements. If the refractory degradation affects the thermal conductivity (as expected), then with time the model predictions of T(r) can start deviating from the direct measurement of temperature distribution. The changes in k(r) can then be correlated with the refractory degradation and used to monitor and manage the refractory. This information can also be correlated with wall thickness as a function of degradation.

The measured temperature distribution can be used to account for the speed of sound variation as a function of temperature. The temperature-compensated TOF of the last echo in the train, reflected from the hot face-reaction zone interface, can be used to estimate the refractory thickness. The measured T(t,r) can be used to continually estimate heat conductivity k(r) in the heat transport model and determine if changes in k(r) are reflective of refractory degradation.

Compensation of the TOF of US echoes for the measured temperature distribution can be used to obtain an accurate on-line assessment of the refractory thickness. The temperature-compensated and uncompensated measurements of Δr can be compared to quantify the achieved accuracy improvement. Small cracks, formed at an early state of refractory degradation, can allow for the introduction of new ultrasound backscatterers that can be detected at a receiver and used to monitor degradation.

Direct US Measurements of Temperature Distribution

US propagation inserts can be of different designs and material options, as schematically depicted in FIG. 6, or a cylindrical rod with collars to create US reflection, as shown in FIG. 7. The cylindrical rod and/or collars can be made from the same material as the refractory by shape casting or machining to obtain the desired shape. The insert can then be placed in the desired location and held in place during the refractory casting. Although the composition of the refractory and insert material may be substantially similar, enough variability can be present to create detectable echoes from insert collars where the insert geometry changes abruptly. Each diameter transition will partially backscatter the US energy to the transducer, creating reflections (750) from the known locations. The alternative insert shapes can be used and, if necessary, changes to the insert compositions can be made to enhance the reflection of the US energy from predetermined spatial locations for a particular design.

The backscatters illustrated in FIGS. 3-5 can involve modifying the insert to create a layered structure with the layer transitions at predetermined locations. Specifically, the density of layers can be changed by slightly modifying composition of each layer. Density changes can create partial reflections of the ultrasound energy. Once the US backscatters in the controlled positions are introduced, the pulsed ultrasound excitation from the cold face can create a train of echoes (450, 452, and 458), the TOF of which can be used to measure a piecewise constant temperature distribution in the refractory, as illustrated in FIGS. 4-5.

Other Applications

The system of the present invention can be used to monitor temperature and thus identify stress along surfaces. For example, a groove can be formed along a leading edge of an airplane wing, turbine fin, or other aerodynamic body. A strip can be formed such that the continuous measurement pathway extends along the strip which is then oriented within the groove. The strip can be formed of material and dimensions that allow for flexibility to follow curved contours of such surfaces. Such strips can also be used along internal surfaces of pipes to measure temperature changes. Metals and metal alloys can be suitable for use as the strips. Such temperature profiles along pipes can be useful for monitoring and controlling reaction rates (i.e. tube reactors), monitoring deposition and buildup, avoiding gel formation and clogging in oil pipelines, and the like. Heat fluxes, q, can also be measured using these devices. Given the measured temperature distribution T(r) and the thermal conductivity, k, the heat flux, q, can be calculated in Equation 7:

$$q = k\frac{dT}{dr} \tag{7}$$

Figure 8:
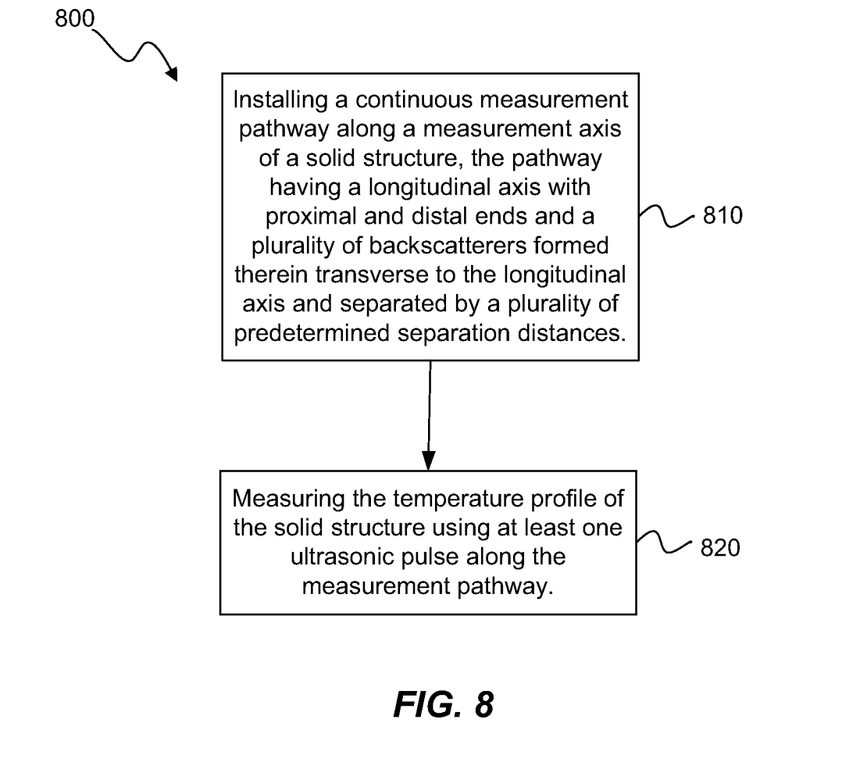
FIG. 8 is a flowchart illustrating a method for of measuring a temperature profile and length of a solid structure along a measurement axis, in accordance with an example.

Another example provides a method (800) measuring a temperature profile and length of a solid structure along a measurement axis, as shown in the flow chart in FIG. 8. The method includes the operation of installing a continuous measurement pathway along a measurement axis of a solid structure, the pathway having a longitudinal axis with proximal and distal ends and a plurality of backscatterers formed therein transverse to the longitudinal axis and separated by a plurality of predetermined separation distances, as in block (810). The next operation of the method can be measurement of the temperature profile of the solid structure using at least one ultrasonic pulse along the measurement pathway, as in block (820).

The operation of measuring the temperature profile of the solid structure may further include the operation of emitting at least one ultrasonic pulse along the measurement pathway from an ultrasonic emitter positioned at the proximal end of the pathway. The operation of receiving a plurality of pulse echoes reflected from the plurality of backscatterers with an ultrasonic receiver adjacent the ultrasonic sound emitter follows. The next operation of measuring can be timing first time intervals between the each of the plurality of pulse echoes. The operation of calculating an instantaneous average temperature of the structure between each of the plurality of backscatterers using the first time intervals follows. The method of measuring may further include outputting the instantaneous average temperatures of the structure between each of the plurality of backscatterers to measure a temperature profile of the solid structure along the measurement axis.

The operation of measuring the temperature profile of the solid structure can further include the operation of receiving pulse echoes reflected from a furthest backscatterer and the distal end of the measurement pathway. The operation of timing a second time interval for a pulse echo reflected from the distal end of the measurement pathway follows. The operation of measuring can also include calculating an instantaneous distance of the measurement pathway using the second time interval. The method of measuring can further include outputting the instantaneous distance of the measurement pathway to measure a thickness of the solid structure along the measurement axis.

The operations described here can also be stored on a computer readable storage medium that includes volatile and non-volatile (transitory and non-transitory), removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. Accordingly, the scope of the invention should be determined solely by the appended claims and their legal equivalents, rather than by the descriptions and examples given above.

What is claimed is:

1. An ultrasonic thermometer for measuring a temperature profile along a measurement axis of a solid structure, comprising:
   a continuous measurement pathway of a solid structure having a longitudinal measurement axis and proximal and distal ends;
   at least two backscatterers formed in the continuous measurement pathway transverse to the longitudinal axis and separated by a predetermined separation distance;
   an ultrasonic emitter positioned at the proximal end for transmitting at least one ultrasonic pulse along the measurement pathway to produce pulse echoes from the at least two backscatterers; and
   a processing device adapted to determine at least one time interval between the pulse echoes and calculate an average temperature between the at least two backscatterers from the at least one time interval, and calculate a temperature distribution between the at least two backscatterers from the average temperature.

2. The ultrasonic thermometer of claim 1, wherein the backscatterers are ultrasonic reflectors embedded across a cross-section of the continuous measurement pathway selected from the group consisting of dispersed metallic particles, dispersed ceramic particles, a metallic grating, a ceramic grating, changes in material composition, changes in material density, a void, and combinations thereof.

3. The ultrasonic thermometer of claim 1, wherein the predetermined separation distance between each of the at least two backscatterers ranges from less than or about two millimeters to about two centimeters.

4. The ultrasonic thermometer of claim 1, wherein at least two predetermined separation distances between at least three backscatterers are different.

5. The ultrasonic thermometer of claim 1, wherein the continuous measurement pathway comprises at least one material having a thermal conductivity of less than or about 0.5 W/m·K.

6. The ultrasonic thermometer of claim 1, wherein the continuous measurement pathway comprises a refractory wall of a heated vessel, with the proximal end being a cold side and the distal end being a hot side, to measure a temperature profile across a thickness of the refractory wall.

7. The ultrasonic thermometer of claim 1, wherein the temperature distribution is calculated by iteratively solving $$T_{ave}(t) = \int_{r_h}^{r_c} T(t,r) dr$$

where $T_{ave}(t)$ is the average temperature at time t, $r_h$ is a radial position of the backscatterer closer to a hot surface, $r_c$ is a radial position of the backscatterer closer to a cold surface, and $T(t,r)$ is the temperature distribution defined by $$\rho C \frac{\partial T}{\partial t} = k \frac{1}{r} \frac{\partial}{\partial r}\left(r \frac{\partial}{\partial r}\right) T \quad (5)$$

where ρ is a density of the solid structure, C is a heat capacity of the solid structure, and k is a thermal conductivity of the solid structure.

8. The ultrasonic thermometer of claim 1, wherein the continuous measurement pathway comprises an elongated body conforming to a surface of the solid structure to measure a temperature profile across of the surface.

9. The ultrasonic thermometer of claim 8, wherein the elongated body is flexible a member having a non-circular cross-sectional profile.

10. The ultrasonic thermometer of claim 1, wherein the continuous measurement pathway comprises an elongated insert configured to be positioned through a thickness of a refractory wall of a heated vessel, with the proximal end being a cold side and the distal end being a hot side, to measure a temperature profile across a thickness of the refractory wall.

11. The ultrasonic thermometer of claim 10, wherein the elongated insert comprises a material substantially similar to a material of the refractory wall.

12. The ultrasonic thermometer of claim 11, wherein the backscatterers are physical discontinuities in a surface of the elongated insert selected from the group consisting of machined collars, cast collars, machined notches, cast notches, and combinations thereof.

13. The ultrasonic thermometer of claim 1, further comprising:
an ultrasonic receiver adjacent the ultrasonic emitter for receiving the pulse echoes;
wherein the processing device comprises:
a timer module configured to determine at least one first time interval between the pulse echoes;
a first calculator module for using the at least one first time interval to determine the instantaneous average temperature of the structure between the at least two backscatterers; and
an output device configured to output the instantaneous average temperature between the at least two backscatterers.

14. The ultrasonic thermometer of claim 13, wherein the at least one ultrasonic pulse has a frequency greater than or about 100 kilohertz.

15. The ultrasonic thermometer of claim 13, wherein the at least one ultrasonic pulse has a frequency greater than or about 1 megahertz.

16. The ultrasonic thermometer of claim 13, wherein the ultrasonic emitter and the ultrasonic receiver are formed together on a MEMS chip.

17. The ultrasonic thermometer of claim 13, further comprising:
the timer module being configured to determine a second time interval for a pulse echo from the distal end of the measurement pathway;
a second calculator module for using the second time interval and a distribution of the instantaneous average temperatures of the structure to determine an instantaneous distance of the measurement pathway; and
the output device configured to output the instantaneous distance of the measurement pathway.

18. The ultrasonic thermometer of claim 13, wherein the ultrasonic emitter and the ultrasonic receiver is the same device.

19. The ultrasonic thermometer of claim 18, wherein the continuous measurement pathway comprises an elongated insert having a diameter ranging from less than or about 1 mm to about 5 cm.

20. The ultrasonic thermometer of claim 13, wherein the ultrasonic emitter and the ultrasonic receiver are placed on the opposite sides of the ultrasound propagation path.

21. The ultrasonic thermometer of claim 20, wherein ultrasonic emitter and the ultrasonic receiver are separated by a lateral distance at the proximal end of the continuous pathway to emit pulses and receive pulse echoes from at least two backscatterers at an acute angle.

* * * * *